Sept. 4, 1962  A. RASPANTE  3,052,379
APPARATUS FOR DISPENSING VARIABLE METERED
QUANTITIES OF FLUID
Filed July 29, 1959  3 Sheets-Sheet 3
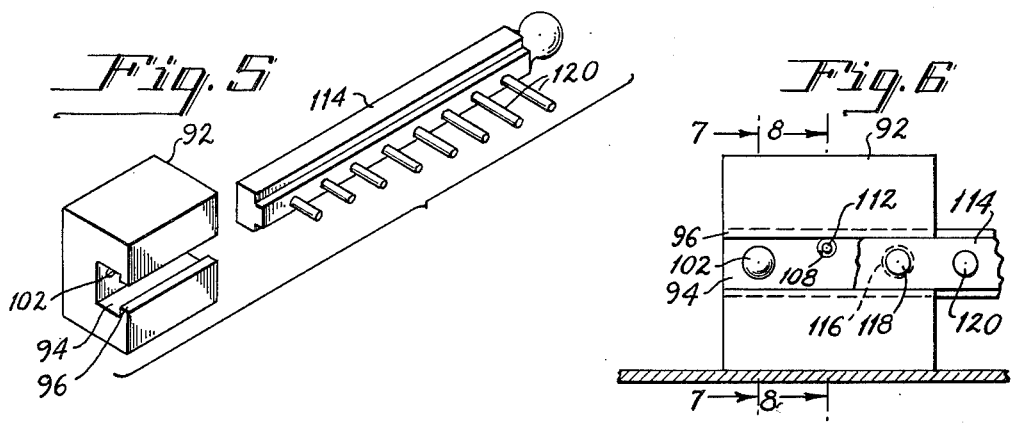
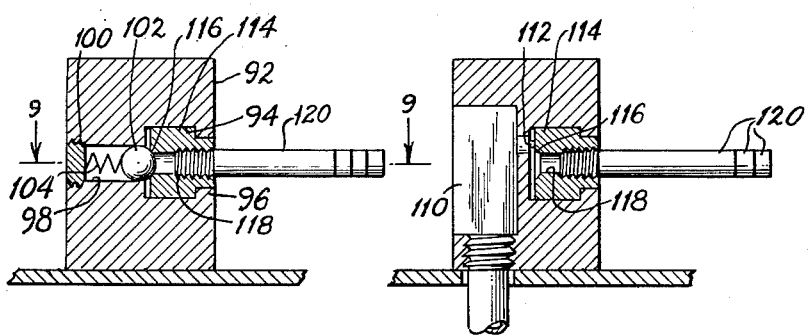
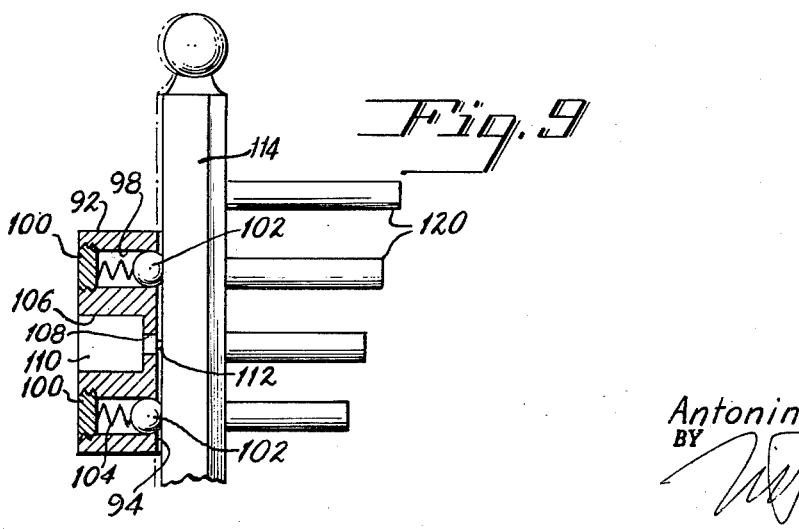
INVENTOR.
Antonino Raspante
BY
ATTORNEY ic Sept. 4, 1962

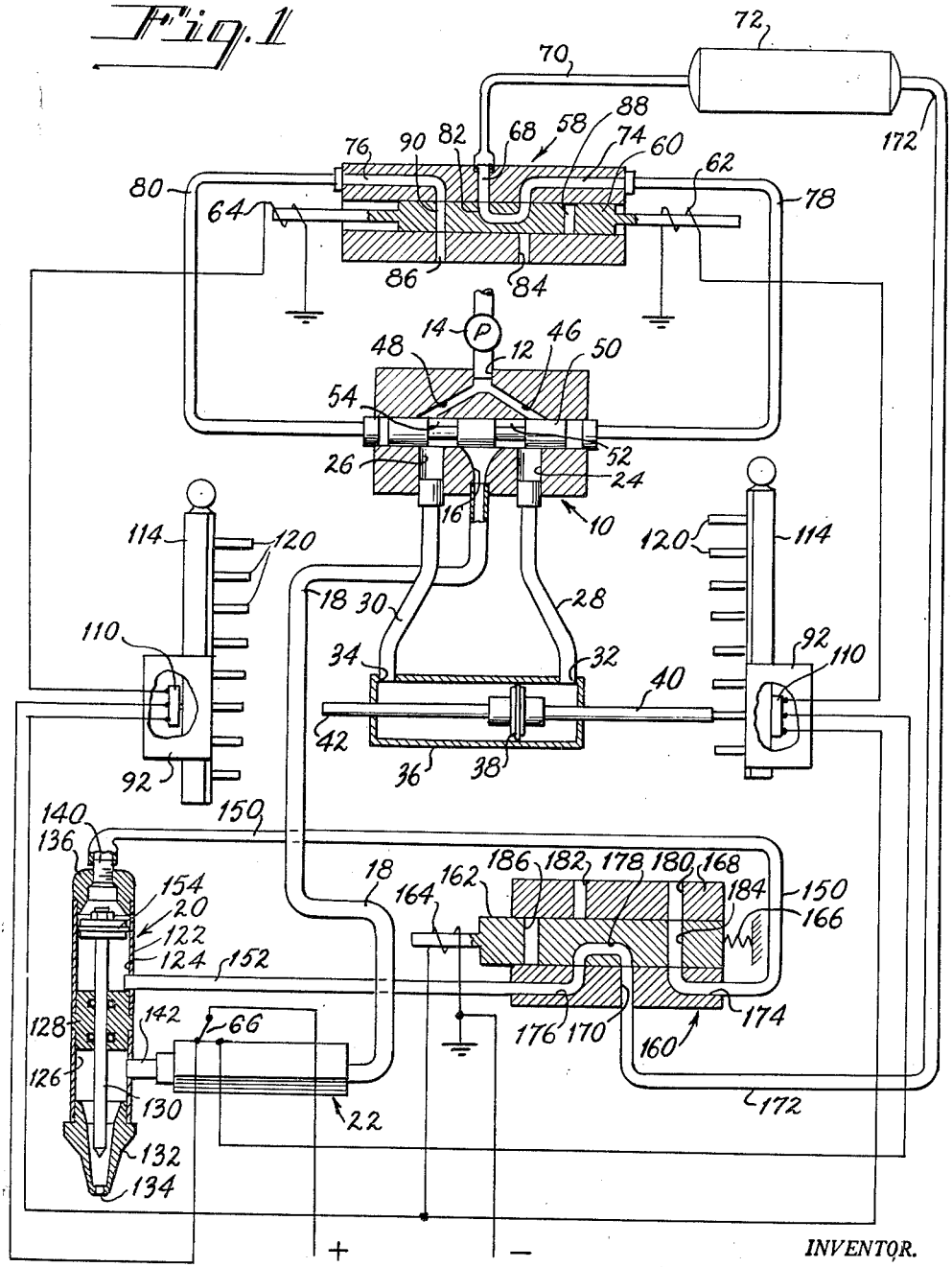

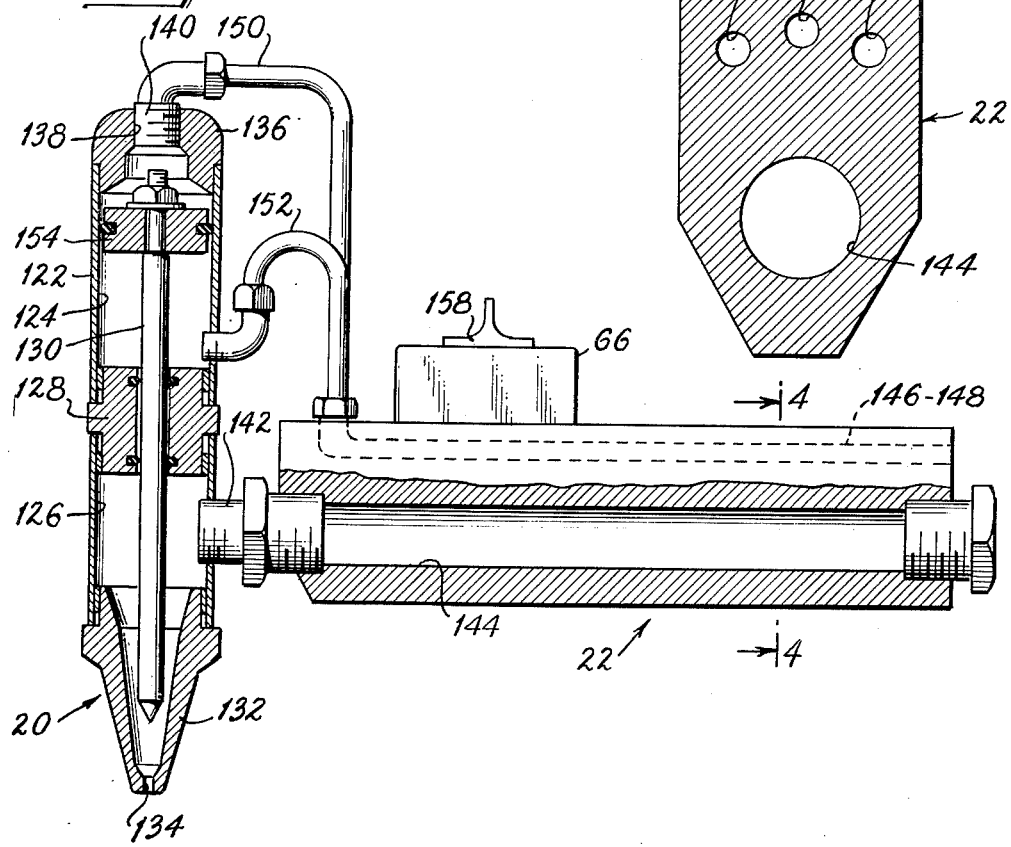

United States Patent Office 3,052,379
Patented Sept. 4, 1962

3,052,379
APPARATUS FOR DISPENSING VARIABLE
METERED QUANTITIES OF FLUID
Antonino Raspante, New York, N.Y.
(157 Heathcote Road, Elmont, N.Y.)
Filed July 29, 1959, Ser. No. 830,365
10 Claims. (Cl. 222—76)

The present invention relates to an apparatus for use in the production of hollow, flexible, soft-walled molded articles, made of a vinyl or like plastic, such as members or parts of doll bodies, or the like, and, more particularly, to apparatus for filling the molds for such articles with measured quantities of monomeric vinyl plastic liquid, for curing.

In the production of members of doll bodies or similar articles from an appropriate vinyl plastic, measured quantities of the vinyl raw material, which is in liquid form, are placed into metal molds, and the metal molds are then placed in the curing oven, or bath, wherein the molds are rotated or tumbled to distribute the liquid evenly on the walls of the mold, as it is cured, to thereby provide hollow, molded plastic shapes of substantially uniform wall thickness.

As heretofore practiced, the liquid raw material was fed into the mold through the application of air pressure, as by an air pump, from the tank or drum of the raw material, from which the liquid was fed to a multiple port valve which was connected to each end of a two-way metering cylinder and piston mechanism. Each chamber of the metering cylinder fed the material, under air pressure, back to the valve, from which the material was led to a nozzle, from which it was discharged by the operator into a mold. The metering of the amount discharged was effected by means of a rotary member or drum mounted on each side of the cylinder, into which was set a plurality of pins of different length, in position for each one to be disposed for contact by a piston rod, extending through the adjacent cylinder end. Thus, if the drum was turned to dispose a longer pin in position to be contacted by the adjacent piston rod as the piston moved to discharge from the adjacent end of the cylinder, the stroke of the piston would be limited to discharge a lesser amount than if a shorter pin was disposed to contact such piston rod.

In the mold-filling devices of the apparatus of the prior art, the discharging of each end of the cylinder was controlled by a manually operated lever that alternately directed fluid into the cylinder, to one side thereof or the other. The operator of the filling apparatus was, therefore, obliged to utilize both of his hands in his work; one to operate the control lever of the fluid pumping part of the apparatus, and the other one to direct the fluid discharge nozzle into the mold. This necessity to use both of his hands and divide his attention between two different operations and two different portions of the apparatus, made the work difficult, slow and time-consuming; and made it inaccurate and wasteful due to frequent spillage of the liquid plastic to the ground because of almost inevitable frequent inaccurate direction of the nozzle.

The present invention is directed to the provision of apparatus for filling molds with measured quantities of monomeric liquid of the character described, which will be automatically operated by electric control through a switch associated with the nozzle to reverse the movement of the valve and the direction of the movement of the cylinder pistons, to thereby enable the operator to concentrate his attention upon the single operation of directing the nozzle into the molds.

It is another object of the present invention to provide automatic mold-filling devices of the character described which, because of the automatic operation thereof, will make the work of the operator simpler and easier, and more rapid.

It is still another object of the present invention to provide automatic mold-filling apparatus of the character described which will reduce misdirected discharge from the nozzle to a minimum, to thereby make the operation less wasteful and more economical, and keep the place around the filling apparatus in a neater and cleaner condition.

It is also an object of the present invention to provide an improved discharge nozzle for the filling apparatus, incorporating the control means for the apparatus and capable and suitable for use with the automatic filling apparatus of the invention, to thereby eliminate any need for attention to the fluid pumping mechanism.

It is a further object of the present invention to provide a nozzle for apparatus of the character described which will eliminate dripping.

It is a still further object of the present invention to provide a metering guage means for the automatic mold-filling apparatus of the present invention which is not only suitable for connection into the electrical control system therefor, but of generally improved characteristics of accuracy and ease and certainty of manipulation.

The foregoing and other objects and advantages of the automatic mold-filling devices of the present invention will become more readily apparent to those skilled in the art from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

In the drawings:

FIG. 1 is a schematic view of the mold-filling apparatus of the present invention, including the electropneumatic system thereof; with its operating mechanism shown in section and part in elevation;

FIG. 2 is a top plan view of the nozzle and handle assembly of the apparatus;

FIG. 3 is a side elevational view of such nozzle and handle assembly; the nozzle being in vertical section and the handle being partly sectional;

FIG. 4 is a section taken on line 4—4 of FIG. 3;

FIG. 5 is an exploded view of the flow control guage of the apparatus of the invention;

FIG. 6 is a front elevation of the same with the flow control guage bar partly broken away to illustrate details of construction and arrangement;

FIG. 7 is a section taken on line 7—7 of FIG. 6;

FIG. 8 is a section taken on line 8—8 of FIG. 6; and

FIG. 9 is a section taken on line 9—9 of FIG. 7.

Generally stated, the invention consists of a preferably pneumatic operated multiple port fluid valve which discharges fluid pumped thereinto alternately into opposed ends of a metering cylinder having a reciprocable piston and which alternately discharges fluid from each end thereof back to the fluid valve, whence it is conveyed to a discharge nozzle. The fluid valve piston is operated by an electrically controlled air valve which directs compressed air alternately against the two ends of the fluid valve piston; the air valve being connected in an electric circuit controlled from the handle of a discharge nozzle. The metering cylinder and piston are regulated by a sliding guage bar opposite each end thereof supporting guaging rods of varying length which may be selectively brought into register with projecting rods of the cylinder piston at each end of the cylinder; each of the guage bar supporting means including a normally closed switch in the electric circuit of the air valve, which is opened by pressure of the guage bar on contact of the piston rod of the metering cylinder with a registering guage rod, to thereby break the electric circuit through the air valve.

The discharge nozzle of the invention includes pneumatically operated reciprocable nozzle shut-off means that are controlled by a second air valve that is electrically operated, at each stroke of the apparatus, from the handle control switch for the first air valve to open and shut the nozzle at the beginning and end of each discharge operation.

In a preferred embodiment, the fluid valve control air valve is connected in two parallel electric circuits each reciprocating its valve piston in one direction, both circuits being alternately opened and closed from the switch in the nozzle handle and each such circuit having the switch of one of the guages connected thereinto.

Referring now, in greater detail, to the mold-filling apparatus of the present invention, illustrated in the accompanying drawing, the same comprises a multiple port, pneumatically controlled fluid valve, generally designated as 10, having a main fluid inlet port, 12, which is connected to a preferably pneumatic pump, diagrammatically indicated at 14, that supplies the monomeric fluid to the valve from a source not indicated. The valve 10 is also provided with a main outlet fluid port 16, which connects by conduit 18, to the discharge nozzle, generally designated as 20, through the handle, 22, thereof, in a manner which will hereafter be explained in greater detail. The valve 10 is further provided at opposed ends thereof with a pair of inlet-outlet ports, 24 and 26, which connect by conduits 28 and 30, respectively, to inlet-outlet ports, 32 and 34, provided at opposed ends of a metering cylinder, 36, in which reciprocates, between ports 32 and 34, a piston, 38, having oppositely directed rods, 40 and 42, which extend through openings in the respective adjacent end walls of the cylinder 36. The port 12 of the valve 10 is formed with inwardly divergent port extensions, 46 and 48, which terminate opposite the inlet-outlet ports 24 and 26, respectively. A reciprocating valve piston, 50, formed with fluid passages, 52 and 54, therethrough is disposed within the valve 10 with its fluid passages arranged so that its passages 52 and 54, respectively, alternately connect ports 24 and 26 with ports 16, the passage 54 connectng port 26 with port extension 48, as passage 52 connects with port 16, and the passage 52 connecting port 24 with port extension 46, as passage 54 connects with port 16.

It will be apparent that after the cylinder 36 has been filled on one side of the piston 38, as through port 24 and conduit 28 and cylinder port 32, movement of the fluid valve piston 50 to connect port extension 48 with the port 26 will conduct fluid under pressure through the port 26, conduit 30 and port 34, into the adjacent end of the cylinder 36, and expel fluid through port 32, conduit 28, fluid valve port 24, valve piston passageway 52 into outlet port 16 and through conduit 18 to nozzle handle 22 to be discharged through the nozzle 20. A similar cycle will take place when the fluid valve piston 50 is moved to open port extension 46 and connect it through valve piston passageway 52, port 24, and conduit 28 with the port 32 of the metering cylinder 36. This will connect ports 26 and 16 in the fluid valve 10 and will force fluid from the cylinder 36 through port 34, conduit 30, valve port 26, valve piston passageway 54, and out of valve port 16 to the discharge nozzle 20.

The reciprocating movement of the fluid valve piston 50 is electro-pneumatically controlled through a preferably double-solenoid air valve generally designated as 58, in which reciprocates a valve piston, 60, having a pair of associated solenoids, 62 and 64, one at each end thereof. Each of the solenoids 62 and 64 is connected in an electric circuit parallel to the other, both of which are controlled for alternate closing and opening by preferably a single-pole, two-way switch, designated as 66, mounted in the handle 22 of the nozzle 20. The air valve 58 is formed with an inlet port, 68, that is connected by a conduit, such as 70, to a compressed air source 72, which may be in the form of a compressor or tank, as illustrated. The housing of the valve 58 is also provided with a pair of outlet ports, 74 and 76, which are connected, respectively, by conduits 78 and 80, to opposite ends of the valve 10, one to each end of the fluid valve piston 50. The air valve piston 60 is provided with a U-shaped passageway, 82, arranged to have its two openings connect alternately the inlet port 68 with outlet port 74, and outlet port 76, as the piston is reciprocated by its solenoids 62 and 64, alternately, from one end of the valve to the other.

The housing of the air valve 58 is also provided with a pair of air escape ports, 84 and 86, each in register, respectively, with the inner end of outlet ports 74 and 76, and the valve piston 60 is provided with spaced air passages, 88 and 90, arranged to connect port 74 with air escape port 84 when passageway 82 connects inlet port 68 with outlet port 76, and to connect port 76 with air escape port 86 when the passageway 82 connects inlet port 68 with outlet port 74.

The metering guages are provided opposite each end of the metering cylinder 36 for adjustably, selectively limiting the amount of liquid discharged back to the fluid valve 50 through that end of the metering cylinder 36. Such metering guages each comprise a block, 92, supported, in any desired suitable manner, opposite an end of the metering cylinder 36. The block 92 is formed with a preferably horizontally extending guideway, 94, of preferably rectangular shape, formed in the side of the block 92 facing the cylinder, said guideway 94 having a reduced opening, providing opposed retaining flanges, 96, along each edge thereof. The block 92 is provided with at least two spaced, transversely extending openings, 98, formed therethrough between the guideway 94 and its opposed side. The openings 98 are each restricted at its outlet into the guideway 94 and threaded at the other end to receive a threaded pin, 100. Each opening 98 houses a ball-bearing, 102, which is tensed against the inner opening thereof, to project into the guideway 94, by means of a spring, 104, abutting against the pin 100. Each of the blocks 92 is also provided with a recess, 106, having a reduced opening, 108, into the guideway 94; the recess housing a normally closed switch, 110, that is connected in one of the two parallel air valve operating circuits, whose operating pin or button, 112, extends through an opening 108 into the guideway 94.

Slidably disposed in the guideway 94 of each block 92 is a T-bar, 114, whose cross-piece is of a thickness less than the width of the wider portion of the guideway 94, and is spaced from the inner wall of the guideway 94, by the projecting parts of the bearings 102, against the retaining lips 92. The inner surface of the T-bar, 114 is provided with recesses, 116, spaced to seat the projecting ends of the bearings 102, in each adjusted position thereof within the guideway 94, to thereby normally maintain the bar 112 in spaced relation to the inner wall of the guideway at each such adjusted position. Preferably, these recesses 116 may coincide with spaced passageways 118 formed through the bar 114, opposite the guideway opening, which are threaded at their other end to receive the threaded end of one of a number of graduated guage rods 120. To simplify the guage construction and make it accurate, the space between passageways 98 in the block 92 will equal the space between alternate guage rods 120 in the T-bar 114.

It will also be understood that each block 92 is so mounted relative the adjacent piston rod 42 or 40, as the case may be, that each of the guage rods 120 may be brought into register therewith to be contacted thereby, for limiting the amount of fluid discharged from an adjacent end of the cylinder 36 back to the fluid valve 50; a shorter rod 120 permitting greater movement of the piston 38, in its direction and discharge of a greater volume of the fluid; whereas, a longer rod 118 will limit the stroke of the piston and permit the discharge of only a smaller volume.

It will also be apparent that as the piston rod 40 or 42, as the case may be, contacts the registering guage rod 120, adjacent thereto, it will press the T-bar 114 against the switch pin 112, to break the circuit through the switch 110 of the circuit in which it is connected, and to de-activate the solenoid connected in that circuit, and keep it de-activated until the handle switch 66 is moved to break the same circuit at the point and to close the other parallel circuit for discharging fluid from the other end of the metering cylinder 36.

The nozzle 20 comprises a tubular body, 122, which is divided into upper and lower compartments, 124 and 126, respectively, by a fixed, central bearing, 128, which is formed with a longitudinal passageway therethrough, in which reciprocates a valve stem, 130. The lower compartment 126 is provided with a nose-piece, 132, set into its end and formed with a passageway therethrough having a restricted outlet opening, 134, forming a valve seat for the tapered end of the valve stem 130. The end of the upper nozzle compartment 124 is closed by a cap, 136, that is provided with an opening, 138, into which is threaded or otherwise secured a nipple, 140.

A nipple, 142, secures the nozzle 20 by the wall of its lower compartment 126 to the handle 22, and connects such compartment to the fluid passageway, 144, formed through the handle that is, in turn, connected to the conduit 18. The handle 22 is also provided with a pair of air passageways, 146 and 148, one of which, as 146, is connected by conduit, 150, to the upper compartment 124, by the nipple 140, and the other one is connected by conduit, 152, to the lower part of the upper compartment 124. The valve stem 130 is provided at its other end, within the upper compartment 124, with a piston, 154, which is reciprocable, under the pressure of air, reversibly admitted and expelled through conduits 150 and 152, between the inlets from said conduits into the compartment 124, to thereby move the valve stem 130 in and out of the valve seat 134.

The handle 22 is provided with a fourth passageway, 156, extending partway therethrough, which serves as a conduit for the wires of the electric circuits that are connected to the switch 66 mounted on the handle 22, which is provided with a sliding button, 158, that may be reciprocated by the operator to alternately open and close the two parallel circuits of the air flow valve 58 of the apparatus.

The valve stem 130 is pneumatically reciprocated to open and close the nozzle outlet 134 for each discharge of fluid from each of the metering cylinder ports 32 and 34. For that purpose, there is provided a second compressed air valve, generally designated as 160, whose piston, 162, is preferably moved to one direction by a solenoid, 164, that is connected with both of the parallel circuits of the air-valve 68, and is automatically returnable to initial position upon the breaking of each of the said circuits by a spring, 166.

The housing, 168, of the valve 160 is formed with a single inlet port, 170, that is connected by a conduit, 172, preferably to the common compressed air source 72. The housing 168 of the valve 160 is also provided with a pair of outlet ports, 174 and 176, one of which, as 174, is connected, through the handle 22, to conduit 150 and to the nipple 140 in the nozzle cap 136. The other outlet port 176 is connected, through the handle 22, to the conduit 152 that connects with the lower part of the upper nozzle chamber 124.

The piston 162 of the valve 160 is provided with a U-shaped passageway, 178, which alternately connects inlet port 170 with outlet ports 174 and 176, as the piston reciprocates in the housing 168. The valve housing 168 is also provided with air escape ports, 180 and 182, respectively, which are connected, respectively, by passageways 184 and 186, in the piston 162, to the outlet ports 174 and 176, respectively, when the other of the outlet ports is connected by passageway 178 to the inlet port 170 of the valve 160. By this arrangement, each time the switch 66 is thrown to close one of the circuits of the apparatus, the solenoid 164 is first actuated to move the piston 162 into position to connect the inlet port 170 with the outlet port 176 and conduit 152 to admit compressed air into the bottom of nozzle chamber 124 to raise the valve stem 130 and open the nozzle outlet 134 for the discharge of fluid therethrough. At the same time, passageway 184 connects the other outlet port 174 with the air escape port 180, for the escape of air from the upper end of the nozzle chamber 124, through conduit 150 and port 174. As the discharge of fluid from the end of the metering cylinder controlled by said circuit is completed by contact of the appropriate piston rod 140 or 142, as the case may be, with the adjacent guage rod 120, to break the circuit at the automatic switch 110, the solenoid 164 is de-activated and the piston 162 returned by spring 166 to connect the valve into port 170 with the outlet port 174 and conduit 150 and the upper end of the nozzle chamber 124 to lower the valve stem 130 and close the nozzle outlet 134; simultaneously connecting the outlet port 176 with passageway 186 and air escape port 182, to discharge the air from the lower part of the nozzle chamber 124.

This completes the description of the preferred embodiment of the automatic mold-filling apparatus of the present invention. Its method of operation will now be described.

To start operation, the guages to each side of the metering cylinder 36 are adjusted for the desired quantity of fluid to be discharged from each end thereof by moving each of the T-bars 114 in its guideway 94 until the desired guage rod 120 opposes the adjacent rod of the piston 38. Both of the guages may be adjusted for dispensing of equal quantities from both ends of the cylinder 36 or for varied dispensing. The latter arrangement is indicated where the amount of fluid to be discharged into any one mold is greater than the maximum amount that can be discharged from any one end of the cylinder 36, and such mold is, therefore, filled by discharging both ends of the cylinder thereinto.

After the guages are thus set, the apparatus is put through a few blind runs, to fill all of its conduits and the lower nozzle cavity 126 with fluid. The apparatus is then ready for use. At this point, the switch 66 is in position for closing one of the two circuits to the apparatus. Assuming, as illustrated, the right-hand circuit of the apparatus is in closed position, as indicated in FIG. 1 of the drawings, this has alined the air valve piston 60 to have air from the compressor 72 led by U-shaped passageway 82 through outlet port 74 and conduit 78 into the right end of the valve 10 and moved the piston 50 thereof into position connecting the valve inlet port by its branch 48, with piston passageway 54 and, therethrough, with the outlet two-way port 26, and conduit 30 with the inlet port 34 of metering cylinder 36 to have fluid pumped into the corresponding end of the cylinder 36, pushing the piston 38 in the direction of outlet valve 32, discharging fluid therefrom back into the fluid valve 10 by conduit 28 and two-way port 24, and thence by fluid piston opening 52 through outlet port 16, conduit 18, and passageway 144 in the nozzle handle 22 and nipple 142 into the lower nozzle cavity 126. In this position, also, the piston rod 40 is in contact with the registering guage rod 120 which is pushed inwardly by the piston 140 to move its supporting T-bar 114 against the inner face of guideway 94 and switch button 112, to thereby open the normally closed switch 110 through the right-hand circuit, to break the same.

In this position, with the right-hand circuit broken, the second, nozzle-controlling air valve is adjusted by spring 166 to direct air through conduit 150 and nipple 140, into the upper end of the nozzle cavity 124 to push the piston 154 and valve stem 130 downwardly, to close the valve outlet 134 of the nozzle 20.

When in the foregoing position, the left-hand circuit of the apparatus is open through the switch 66 but is closed through the normally closed guage switch 110 thereof. Subsequent movement of the switch 66 to close the left-hand circuit will break the right-hand circuit at that point, and will activate the solenoid 64 of air valve 58 to connect the compressed air source by U-shaped passageway 82 with the outlet port 76 of the air valve, simultaneously connecting the port 74 with the passageway 88 and escape port 84, to permit escape of compressed air from the pneumatic system controlled by the right-hand circuit. Compressed air will then be directed by conduit 80 from port 76 against the other end of piston 50, to move the latter toward the right, to connect the fluid pump 14 by inlet port branch 46 through piston passageway 52 with the two-way port 24 and, through conduit 28, with the metering cylinder inlet 32. At the same time, piston passageway 54 is moved to connect outlet port 16 with the port 26. This brings fluid under pressure through port 32 into the right-hand side of the cylinder 36 and moves the piston 38 thereof towards the left, to expel the contents of the left-hand side of such cylinder through port 34, conduit 30, port 16, conduit 18, and handle 22 into the lower nozzle compartment 126 for discharge through the outlet 134 thereof. Simultaneously with the closing of the left-hand circuit by the switch 66, the solenoid 164 of the second air valve is activated to direct compressed air therethrough by its U-shaped passageway 178 through port 176 and conduit 152 into the lower end of the upper nozzle chamber 124 to move the valve stem 130 out of nozzle-closing position, to permit the discharge of the fluid from the lower nozzle chamber 176; the valve piston 162 simultaneously connecting the conduit 150 through passageway 184 with escape port 180 to discharge the compressed air from above the valve stem piston 154 in the upper nozzle chamber 124. Fluid under pressure will continue to be discharged from the left-hand side of the metering cylinder 36 until the left-hand piston rod thereof, 42, strikes the registering guage rod 120, thereby stopping the movement of the piston and the discharge of fluid from that end of the cylinder and also pushing its supporting T-bar 114 against the contiguous guage switch 110, to break the left-hand circuit, which remains open at that point until the right-hand circuit is closed by switch 66 and the piston 38 is activated thereby to move in the opposed direction. The breaking of the left-hand circuit through the switch 110 thereof de-activates the solenoid 164 of the second nozzle-control air valve 160, to have its piston 162 move by action of spring 166 to reverse the air flow therethrough back into the upper part of the upper chamber 124 of the nozzle, to move the nozzle piston 154 and attached valve stem 130 downwardly to seal off the nozzle outlet 134, which will remain sealed until the switch 66 is operated to again close the right-hand circuit of the apparatus; repeating the cycle described above.

It will be apparent from the foregoing that the apparatus of the present invention is fully automatic in its operation and is controlled from a single point on the handle of the nozzle, thereby enabling the operator to concentrate his attention on the direction of the flow of material into a mold, for maximum operator efficiency and minimum waste of time or material. It will also be apparent that the apparatus of the present invention is provided with a new and improved nozzle having an automatic shut-off which eliminates leakage and dripping, to make the filling operation neat and clean, as well as additionally economical.

It will be further apparent that numerous modifications and variations in the automatic mold-filling apparatus of the present invention may be made by any one skilled in the art, in accordance with the principles of the invention hereinabove set forth, and without the exercise of any inventive ingenuity. I desire, therefore, to be protected for any and all such modifications and variations that may be made within the spirit of the present invention and the scope of the claims hereto appended.

What I claim is:

1. Apparatus for dispensing metered quantities of fluid, including a metering cylinder having spaced inlet and outlet ports and a piston reciprocable under pressure of fluid between said ports, mechanism for discharging fluid under pressure into said cylinder alternately to each side of said piston, means connected in parallel electric circuits each operating and controlling said mechanism for discharge of fluid into said cylinder to one side of said piston and adjustable means for variably limiting the stroke of said piston in each reciprocating direction thereof, said stroke-limiting means comprising a rod on said piston extending through each end of said cylinder, a bar adjacent each end of said cylinder, in spaced relation thereto, means, including a body having a recess formed therein, slidably supporting said bar within said recess, resilient means tensing each said bar within its supporting recess toward the adjacent end of said cylinder, a plurality of graduated guage rods mounted on said bar each adapted to be selectively positioned in alinement with the adjacent end of said piston rod upon the sliding of said bar within said recess, a normally closed switch connected in the electric circuit effecting the discharge of compressed fluid into the opposed end of said cylinder mounted on said bar supporting means, said switch having means extending into said recess and engageable by said bar to open said switch when said guage rod mounted thereon is engaged by the adjacent end of said piston rod and moved inwardly thereby into said recess.

2. The apparatus of claim 1, wherein said resilient means urging said bar toward said cylinder comprises at least two spring-tensioned detents mounted on said body and extending into said guideway, said detents spaced from one another a distance equal to the space between adjacent of said guage rods, said bar having spaced detent recesses formed therein adapted to receive said resiliently mounted detents.

3. Apparatus for dispensing metered quantities of fluid including mechanism for supplying fluid under pressure from a common source to a common outlet, said mechanism including a pair of metering chambers each connected to said common outlet, electrically controlled means connected in parallel electric circuits alternately discharging fluid from each of said metering chambers to said common outlet, a nozzle connected to said common outlet, said nozzle having an outlet and a valve pin reciprocable therewithin for opening and closing said outlet, and electrically controlled means connected in each of said parallel circuits for moving said valve stem in and out of nozzle outlet opening position upon discharge of fluid from each of said metering chambers.

4. The apparatus of claim 3, wherein said nozzle comprises a pair of chambers including a fluid chamber connected to said common outlet and having said nozzle outlet opening formed therein and a compressed air chamber, a bearing separating said chambers, said valve stem reciprocably supported in said bearing and extending into said compressed air chamber, said valve stem having a piston secured thereto within said compressed air chamber, said compressed air chamber having air inlet means, and air outlet means, one to each side of said piston, said air inlet and air outlet means connected to an air valve, said air valve having associated electrically controlled means for discharging air therethrough alternately to said inlet means and said outlet means of said compressed air chamber of said nozzle, said electrically controlled means connected in each of said parallel circuits.

5. The apparatus of claim 3, wherein said nozzle comprises a pair of chambers including a fluid chamber connected to said common outlet and having said nozzle outlet opening formed therein and a compressed air chamber, a bearing separating said chambers, and said valve stem is reciprocably supported in said bearing and extends into said compressed air chamber, said valve stem having a piston secured thereto within said compressed air chamber, said compressed air chamber having air inlet means and air outlet means, one to each side of said piston, said air inlet and air outlet means connected to an air valve, said air valve having associated electrically controlled means for discharging air therethrough alternately to said inlet means and said outlet means of said compressed air chamber of said nozzle, said electrically controlled means connected in each of said parallel circuits, and wherein said nozzle is provided with a handle, said handle having a passageway formed therethrough connecting said common fluid outlet with said fluid chamber of said nozzle, said handle having switch means mounted thereon connected in each of said parallel circuits, said switch means manually operable for alternately closing each of said parallel circuits.

6. Apparatus for dispensing metered quantities of fluid, including a metering cylinder having spaced inlet and outlet ports and a piston reciprocable between said inlet and outlet ports, mechanism for reciprocating said piston within said cylinder between said spaced inlet and outlet ports, means connected in an electric circuit for operating and controlling said mechanism, adjustable means for variably limiting the stroke of said piston in at least one reciprocating direction thereof, a normally closed switch in said electric circuit, means on said piston stroke-limiting means for opening said switch at the end of said piston stroke, a nozzle having an inlet opening and an outlet opening, means connecting said nozzle inlet opening to each of said metering cylinder ports, and means within said nozzle for opening and closing said outlet opening, including a valve stem movable in and out of said nozzle outlet opening and means connected in said electric circuit moving said valve stem out of closing position at the beginning of each of said piston strokes and into closing position at the termination of each of said piston strokes.

7. Apparatus for dispensing metered quantities of fluid, including a metering cylinder having spaced inlet and outlet ports and a piston reciprocable between said inlet and outlet ports, mechanism for reciprocating said piston within said cylinder between said spaced inlet and outlet ports, means connected in an electric circuit for operating and controlling said mechanism, adjustable means for variably limiting the stroke of said piston in at least one reciprocating direction thereof, a normally closed switch in said electric circuit, means on said piston stroke limiting means for opening said switch at the end of said piston stroke, a nozzle having an inlet opening and an outlet opening, means connecting said nozzle inlet opening to each of said metering cylinder ports, and means within said nozzle for opening and closing said outlet opening, including a valve stem movable in and out of said nozzle outlet opening, and means connected in said electric circuit moving said valve stem out of closing position at the beginning of each of said piston strokes and into closing position at the termination of each of said piston strokes, and switch means connected in each said electric circuit for opening and closing the same mounted on said nozzle.

8. Apparatus for dispensing metered quantities of fluid, including a metering cylinder having spaced inlet and outlet ports and a piston reciprocable between said inlet and outlet ports, mechanism for reciprocating said piston within said cylinder between said spaced inlet and outlet ports, means connected in an electric circuit for operating and controlling said mechanism, adjustable means for variably limiting the stroke of said piston in at least one reciprocating direction thereof, a normally closed switch in said electric circuit, means on said piston stroke-limiting means for opening said switch at the end of said piston stroke, a nozzle having an inlet opening and an outlet opening, means connecting said nozzle inlet opening to each of said metering cylinder ports, and means within said nozzle for opening and closing said outlet opening, including a valve stem movable in and out of said nozzle outlet opening and means connected in said electric circuit moving said valve stem out of closing position at the beginning of each of said piston strokes and into closing position at the termination of each of said piston strokes, a handle on said nozzle and switch means in said electric circuit for opening and closing the same mounted on the handle.

9. Apparatus for dispensing metered quantities of fluid, including a metering cylinder having spaced inlet and outlet ports and a piston reciprocable under pressure of fluid between said inlet and outlet ports, mechanism for discharging fluid under pressure into said cylinder alternately to each side of said piston, means connected in parallel electric circuits each operating and controlling said mechanism for discharge of fluid into said cylinder to one side of said piston, means adjustably limiting the stroke of said piston in each reciprocating direction thereof, a normally closed switch in each of said circuits, and means at each of said piston stroke-limiting means for opening said switch at the end of the stroke of said piston effected by the circuit in which it is connected, a nozzle having an inlet opening and an outlet opening, means connecting said nozzle inlet opening to each of said metering cylinder ports and means within said nozzle for opening and closing said nozzle outlet opening at the beginning and end of each of said piston strokes, including a valve stem movable in and out of said nozzle outlet opening and electrically actuated means connected in each of said electric circuits moving said valve stem out of closing position at the beginning of each of said piston strokes and into closing position at the termination of each of said piston strokes.

10. Apparatus for dispensing metered quantities of fluid, including a metering cylinder having spaced inlet and outlet ports and a piston reciprocable under pressure of fluid between said inlet and outlet ports, mechanism for discharging fluid under pressure into said cylinder alternately to each side of said piston, means connected in parallel electric circuits each operating and controlling said mechanism for discharge of fluid into said cylinder to one side of said piston, means adjustably limiting the stroke of said piston in each reciprocating direction thereof, a normally closed switch in each of said circuits, means at each of said piston stroke-limiting means for opening said switch at the end of the stroke of said piston effected by the circuit in which it is connected, manually controlled switch means connected in said circuits for alternately closing each of said circuits and opening the other, a nozzle having an inlet opening and an outlet opening, means connecting said nozzle inlet opening to each of said metering cylinder ports, and means within said nozzle for opening and closing said nozzle outlet opening, including a valve stem movable in and out of said nozzle outlet opening and electrically controlled means connected in each of said electric circuits moving said valve stem out of closing position upon the closing of each of said circuits by said manual switch and into closing position upon the breaking of said circuits through said normally closed switch at the termination of a piston stroke effected by the termination of said piston stroke.

References Cited in the file of this patent
UNITED STATES PATENTS

| | | |
|---|---|---|
| 1,932,976 | Lamb | Oct. 31, 1933 |
| 2,649,996 | Harrington | Aug. 25, 1953 |
| 2,673,012 | Harrington | Mar. 23, 1954 |
| 2,686,281 | Shum | Aug. 10, 1954 |

FOREIGN PATENTS

| | | |
|---|---|---|
| 176,682 | Austria | Nov. 10, 1953 |